July 16, 1940.    J. W. DAEHLER    2,208,154
LAMP
Original Filed July 17, 1934    2 Sheets-Sheet 1

INVENTOR.
John W. Daehler,
BY Alfred H. Daehler.
ATTORNEY.

July 16, 1940.  J. W. DAEHLER  2,208,154
LAMP
Original Filed July 17, 1934   2 Sheets-Sheet 2
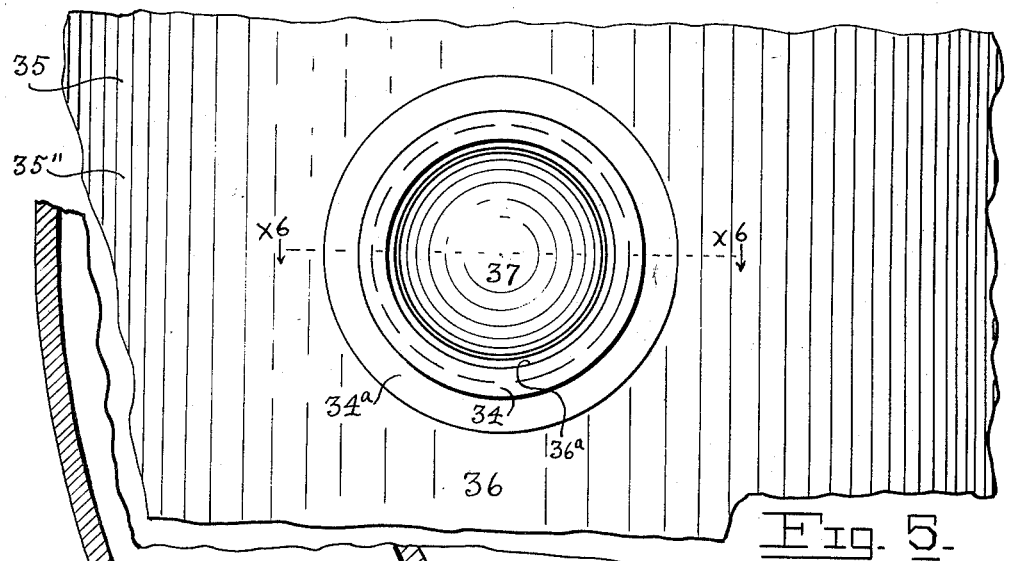
Fig. 5.
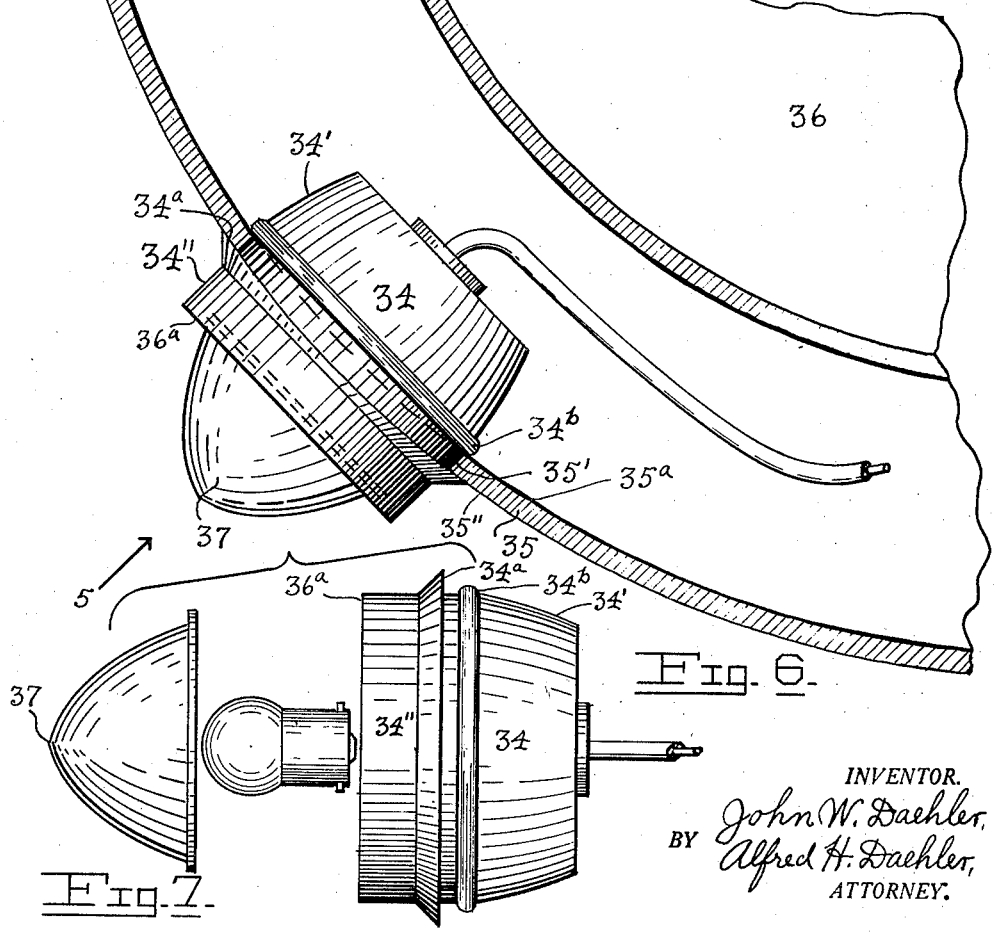
Fig. 6.
Fig. 7.
INVENTOR.
John W. Daehler,
BY Alfred H. Daehler,
ATTORNEY.

Patented July 16, 1940

2,208,154

UNITED STATES PATENT OFFICE 2,208,154

LAMP

John W. Daehler, Los Angeles, Calif.

Application July 17, 1934, Serial No. 735,623
Renewed January 4, 1937

2 Claims. (Cl. 240—7.1)

This invention relates to lamps, and more particularly to lamps adapted to withstand shocks, jars and the vibration incidental to or attending upon their use upon vehicles, moving machinery and the like, and in fact in any position where a lamp is apt to be subjected to such usage as would tend to extinguish the light furnished thereby or otherwise injure the lamp or parts thereof.

A particular field of usefulness for the lamp is in the automotive field, where the shocks and vibrations incident to the travel of a motor vehicle over rough roads or due to collisions and contacts with other vehicles causes the rapid destruction of the filament in the electric globes ordinarily depended upon for the illumination of the roadway and as danger signals to be observed by the drivers of other vehicles and the public generally. Inasmuch as the extinguishment of the tail light or other warning lights not directly visible to the driver of a motor vehicle equipped with the same frequently results in serious accidents, it is one of the principal objects of the present invention to provide a safety lamp for use in such positions in which the delicate filament, as well as all other lamp portions are, as far as possible, insured against damage or destruction.

A further object of the invention is to provide a lamp adapted for use in the gun turrets of water craft, and like places and positions, and which may be subjected, without damage, to the violent shocks occasioned by the firing of heavy artillery or ordnance of any kind whatsoever.

With the above and other objects in view, including the provision of a lamp in which the globe or filament carrying element is cushioned or yieldably mounted within or upon a resilient, yielding casing or means capable of being temporarily deformed under stress and of automatic restoration to original form as well as being readily removable from such casing for purposes of replacement or substitution without the use of any tools whatsoever, the invention consists in the novel provision, formation, combination and association of parts, members and features, and special materials employed in construction all as hereinafter described, shown in the drawings, and finally set forth in claim.

In the drawings:

Figure 5 is a fragmentary elevation showing the rounded corner of a motor bus or like vehicle as equipped with a resilient and shock-proof lamp of slightly modified form, constructed and organized to embody the invention, the view being taken looking in the direction of the large arrow 5 near Figure 6;

Figure 6 is a horizontal sectional detail view taken on the lines $x6$—$x6$, Figure 5, and looking in the direction of the appended arrows; and Figure 7 is a side elevation of the lamp shown in Figures 5 and 6, the same being shown in detached position or as removed from its position of service and with the lens and electric lamp globe thereof detached from remaining lamp features.

Figures 1, 2:
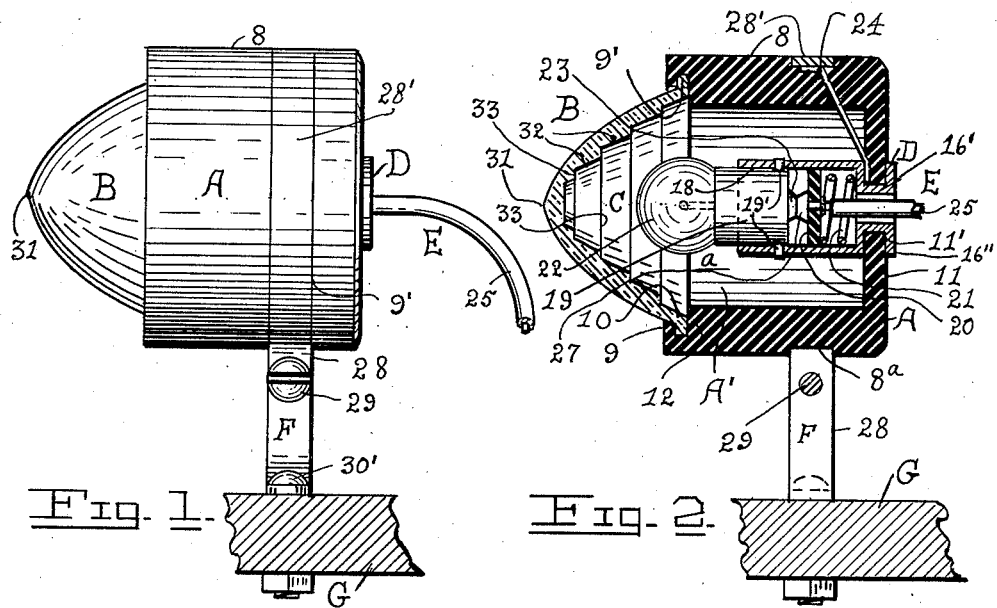
Figure 1 is a vertical side elevation showing a vehicle lamp such as a tail light, constructed and organized to embody the invention.
Figure 2 is a central vertical sectional detail view of the tail light shown in Figure 1.

The parts in the several figures are designated by reference characters.

Referring with particularity to the drawings, in the embodiment of the invention therein shown, A designates a lamp casing or body formed of resilient, yielding and cushioning material, such as rubber of the proper flexibility and hardness to permit distortion under the pressure of severe impacts or by pulling at the casing mouth with the fingers and thumb to permit the removal of an axially projected and extended bulbous lens, B; C designates an electric light globe or illuminating means, D designates supporting means for the removable electric globe C, E designates electrical energy supplying means, and F designates means for supporting the casing A and its associated and combined features from a vehicle frame member, body or other place of attachment, the supporting means F being shown as adapted for ready connection with or disconnection from both the casing or body A or the vehicle member indicated at G.

The casing A is shown in this preferred embodiment of the invention as of generally cylindrical form and open at one end, as at $a$, where the cylindrical peripheral wall 8 is provided with a flexible yielding resilient lens-retaining inwardly directed lip 9, which lies outwardly of an internal annular or circular channel 9' formed for the reception of and to snugly house the flanged rearward peripheral portion 10 of the lens B. The cylindrical outer casing wall 8 is shown as thickened inwardly of the channel 9' and as of uniform thickness throughout the length of the internal lamp-chamber formed at A', the integral resilient rubber body or casing A terminating in a relatively thin integrally-formed cushioning vibration-resisting lamp-supporting or lamp-mounting diaphragm 11; in channel 9' the thickened wall forms a seat 12 for the inner flat annular face 13 formed at the lens flange portion 10.

The diaphragm, constituting the end wall of the casing, opposite the lens, is centrally apertured at 11' to accommodate the lamp-supporting means D.

This diaphragm 11 is shown of much greater diameter than the globe supporting means D which is mounted thereon, and consequently presents a relatively great area of yielding, resilient rubber in sheet form, held in stretched condition and supported at its edges by the integrally formed thick cylindrical wall 8.

The resilient casing A is shown as having a circumferential relatively broad and shallow supporting-means-receiving channel 8a formed therein to accommodate the supporting means F and provide for the ready attachment of the resilient casing A thereto or the release of the same therefrom.

The yielding and cushioning and shock-absorbing diaphragm upon which the globe-mounting means D is supported provides against any shocks to the lamp and its filament; such mounting means D is shown as a metallic lamp-socket 14 which comprises a pair of opposed spaced arm members 15 of arcuate cross-sectional form adapted to snugly embrace a lamp-globe base between them, and which arms extend longitudinally of the axis of the casing A from a transverse base plate or disc portion 16 with which they are preferably formed; this base plate lies against the inner face of the resilient diaphragm 11, and a neck 16' extending through the aperture of the diaphragm connects the base plate with an annular flange 16'' at the outer face of the diaphragm; each globe-embracing arm has a notch 17 formed therein in one of its longitudinal edges, and each notch extends first laterally inward, and then toward the open mouth of the socket 14, as at 17'; these notches are formed at diametrically opposite points in the socket in order that each may receive one of a pair of diametrically opposite pins 19' arranged to extend laterally of the globe-base 19 of the globe C, as will be readily understood by those skilled in the art; slidably mounted between the arm members 15 is a piston-like member or apertured disc 20 formed of insulating material; this disc 20 is normally pressed towards the mouth of the socket by a coil spring 21.

The illuminating means C is shown as a small globe of glass 22 having an electrically lighted filament therein and mounted upon the base 19, this lamp being of the conventional type; the base makes contact with the socket arms and the second contact is made by a central base contact point 23 which engages a contact point 27 at the corresponding face of the disc. A circuit wire 24 extends from the socket base to the channel 8a where it contacts with the metallic supporting means F, and through the medium of which it is grounded upon the vehicle frame. The globe may be inserted in the socket in the usual manner.

The means E may comprise in addition to the wire 24, a flexible cable 25 which terminates at its one end in the disc contact point 27; the other end of the cable may be connected in circuit in the usual manner.

The means F is shown as a one-piece metallic strap 28, which has a circular loop 28' partly surrounding the casing A and which lies in the channel 8a in engagement with the circuit wire 24; each terminus of the strap is bent outwardly from the loop as at 28'' where the parallel spaced portions are apertured to receive a clamping bolt 29 having a nut 30 for tightening the strap; beyond the parallel portions each strap end is bent to conform to the vehicle frame and apertured to receive an attachment screw or bolt 30' for securing the same to the frame at G.

When a lamp is to be replaced by a fresh one, it is only necessary to work or pull the resilient flexible material at the lens-retaining lip 9 outwardly, the lip readily yielding under such treatment by the fingers and thumb of one hand, and work the bulbous lens out of its socket with the fingers and thumb of the other hand through the open mouth of the casing, the projected and extended lens front being especially adapted and formed to facilitate such removal and furnishing the necessary leverage for a prying action. After lamp replacement, which is effected through the open mouth of the casing, the lens may be readily replaced in its socket or groove. A broken lens may be readily replaced in a similar manner and all without the use of a single tool or implement.

To adapt the lens for this purpose, the outer surface may be in the form of a parabola or approximately ovoid, the blunt lens point lying far outwardly of the casing mouth, as at 31, and the inner surface may be formed of a series of conical or like surfaces 32, joined by step formations 33.

The lamp globe is so held, in a position lying upon the axis of the casing A and extending away in right angular relation from the central portion of the diaphragm, that oscillations of the same laterally as well as forwardly and backwardly may be caused by jars or vibration incident to vehicle travel, due to temporary distortion of the rubber diaphragm, which usually is placed in a vertical position when the light is upon a road vehicle, while the axis of the lamp is horizontal, without injury to the filament or glass globe, the cushioning action of the supporting parts preventing any damage thereto; nor can the lamp globe ordinarily strike the cylindrical casing wall although such striking would not damage the lamp inasmuch as such wall acts as a cushion also. To remove the lamp casing from the vehicle it is only necessary to loosen the clamping screw and withdraw the casing and combined parts through the loosened loop.

Figures 3, 4:
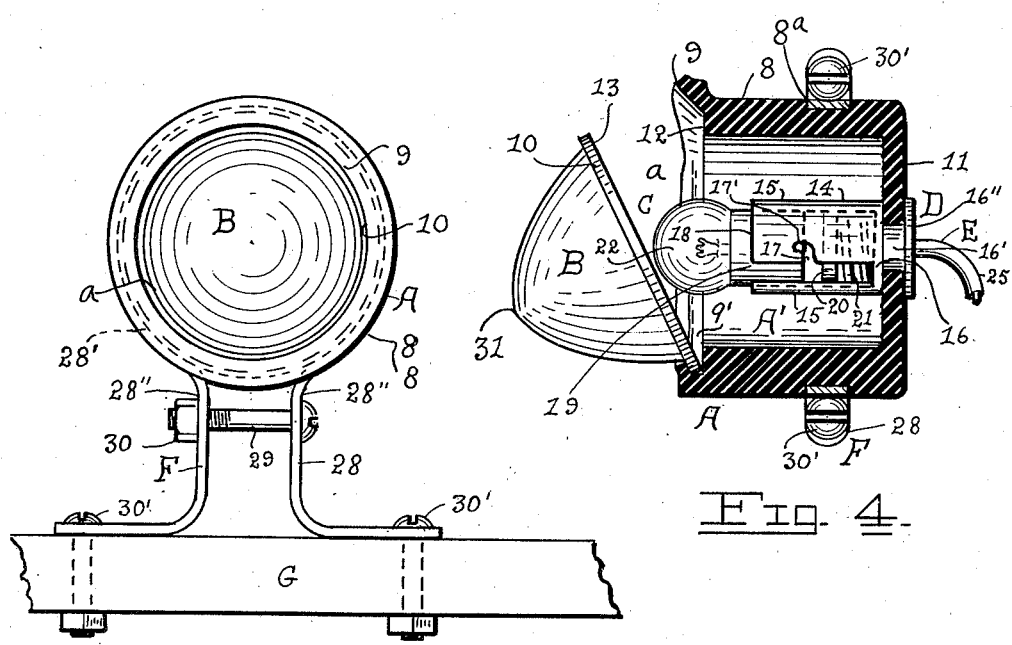
Figure 3 is a face view of the tail light shown in the other figures.
Figure 4 is a horizontal sectional detail view showing how the tail light body may be flexed or temporarily distorted for purposes of lamp globe or lens replacement as well as for purposes of receiving and withstanding shocks and impacts without damage or failure in its functioning.

In the form of the invention shown in Figures 5, 6 and 7, the vehicle body itself serves as a lamp-mounting, the supporting brackets not being necessary in this use of the invention; the construction and organization of the lamp here being described is, generally, the same as the lamp per se described in connection with the showing in Figures 1, 2, 3, and 4, and such lamp comprises the resilient preferably rubber or composition body 34 of tapered or rounded form at 34' at its rearward housed portion and of preferably cylindrical form at its forwardly projected portion 34''; a front outstanding lateral annular retaining flange 34a and a rearwardly disposed outstanding lateral rounded annular retaining flange 34b are preferably formed integrally with the body portion 34; the flexible lens-retaining lip is shown at 36 and the lamp per se is shown as removably supported in the wall 35 thereof, a circular aperture 35' being provided for the reception of the lamp in the rounded corner portion 35" of the wall 35; the lamp body, due to its resilient and yielding nature may be forced into the aperture 35' by pressing the same inwardly until the yielding rounded flange 34b has passed entirely through such aperture 35' and the forward flange 34a is seated against the outer wall surface of the wall portion 35" of the vehicle, so sealing the opening or aperture 35', the lamp being held in position by the outstanding flanges. The lamp body between the flanges is preferably of such diameter that it snugly fits the aperture 35'; the lamp may be readily removed from its supported position by pulling or working the same outwardly to draw the rounded retaining flange 34b through the opening; in the manner just described, a lamp having the characteristics above mentioned, may be readily placed in its apertured mounting and removed therefrom as by a sort of "buttoning" and "unbuttoning" process, in a manner similar to that in which the lamp lens is removed from the resilient body for lamp replacement or lens replacement or like purposes.

It will be understood that many changes and departures may be made from the specific disclosure herein without departing from the spirit of the invention and the terms of the following claims:

Having thus disclosed my invention, I claim and desire to secure by Letters Patent:

1. A lamp of the character disclosed adapted to resist shocks and jars incident to severe service comprising a one-piece hollow cup-like body tapered at its rearwardly disposed peripheral portion to facilitate its entry into a suitably apertured mounting means, said body being formed intermediately of its ends and at its periphery with a portion adapted to coact with said mounting means to seat the same therein and with a retaining flange and being formed at its forward open mouth with a lens seat and a flexible lens retaining lip, a removable lens seated and retained at said open mouth, an electric lamp and means for mounting the same in a protected position at the proper focal point of the lens in the hollow interior of said resilient body and in position to have rays therefrom projected outwardly by said lens.

2. In a courtesy lamp for automobiles, a body of resilient rubber-like material adapted to fit in an aperture in a plate, said body including a tapered rear portion wider at its forward end than the aperture and smaller at its rear end than the aperture, said body having a front portion wider than the forward end of the rear portion, said front portion including a smoothly cylindrical front portion adapted to rest directly on the outside of the plate whereby the entire cylindrical portion resists inward movement of said base, a groove being provided around the body between the rear and front portions to receive the edge of the plate surrounding its aperture; means in said body to support a lamp socket, and means on said body to support a lens.

JOHN W. DAEHLER.